United States Patent [19]

Fluck

[11] 4,006,813
[45] Feb. 8, 1977

[54] ARTICLE SEPARATING AND CONVEYING SYSTEM

[75] Inventor: Rene Fluck, Neuhausen am Rheinfall, Switzerland

[73] Assignee: SIG Schweizerische Industrie-Gesellschaft, Neuhausen am Rheinfall, Switzerland

[22] Filed: July 9, 1974

[21] Appl. No.: 487,210

[30] Foreign Application Priority Data

July 9, 1973   Switzerland ........................ 9964/73

[52] U.S. Cl. .................................. 198/488; 198/491
[51] Int. Cl.[2] ......................................... B65G 47/26
[58] Field of Search ........... 198/34, 25, 20 R, 31 R, 198/31 AA, 31 AB, 31 AC, 37, 40, 103, 24, 106, 102, 209, 212, 211, 461, 491, 488, 487; 214/1 B, 1 BC

[56] References Cited

UNITED STATES PATENTS

| 2,158,069 | 5/1939 | Grover | 198/37 |
| 2,884,114 | 4/1959 | Oberwelland | 198/24 |
| 3,572,495 | 3/1971 | Luginbuhl | 198/34 |
| 3,812,948 | 5/1974 | Luginbuhl | 198/34 |

Primary Examiner—Robert J. Spar
Assistant Examiner—James M. Slattery
Attorney, Agent, or Firm—Spencer & Kaye

[57] ABSTRACT

A device for conveying and separating articles which are moved, while in engagement with each other, by an input conveyor and are transferred by a periodically operating transfer member onto an output conveyor which operates in synchronism with the transfer member and which engages the articles during their conveying movement and conveys them with a speed which is greater than the speed of the input conveyor. The transfer member is composed of a first pusher which moves transverse to the conveying direction for transferring each item from the output end of the input conveyor onto the output conveyor, and a second pusher which is driven independently of the first pusher for holding back the item immediately following the item being transferred until the first pusher returns to its starting position.

6 Claims, 6 Drawing Figures

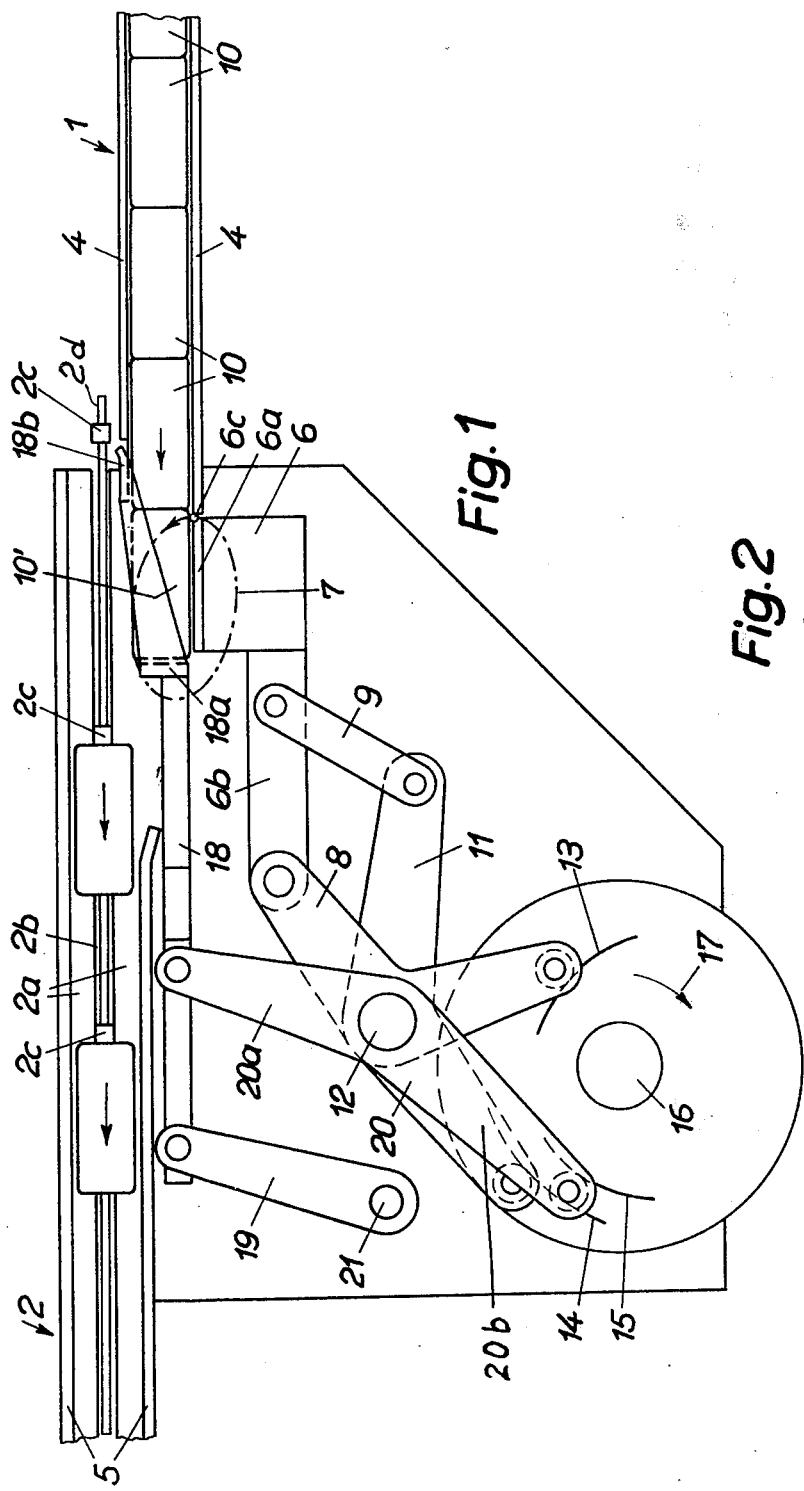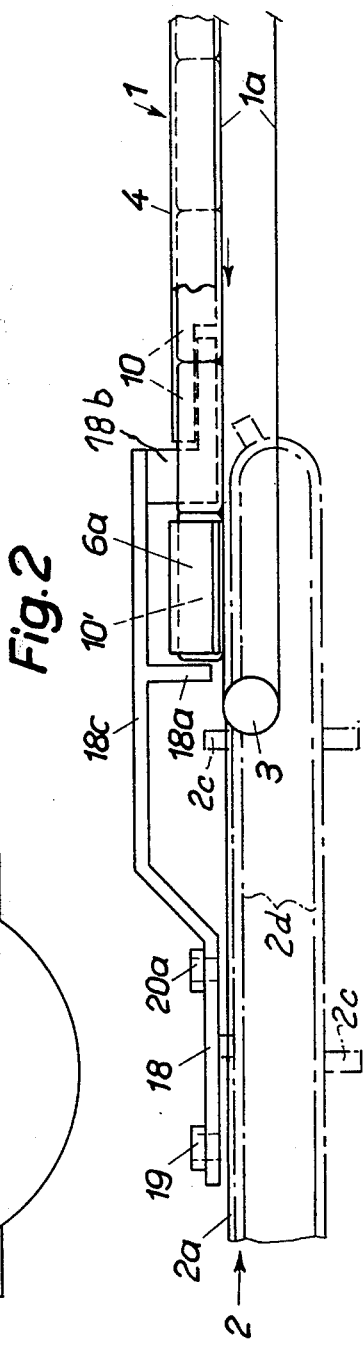

ARTICLE SEPARATING AND CONVEYING SYSTEM

BACKGROUND OF THE INVENTION

The present invention relates to a conveying system of the type which conveys a succession of items which are initially in engagement with one another and which separates the items from one another during the course of conveyance.

U.S. Pat. No. 3,812,948 discloses a conveying system provided with an apparatus for separating items which are moved in engagement with each other by an input conveyor and are transferred onto an output conveyor, the apparatus including at least one periodically operating transfer member whose operation is synchronized with the output conveyor, the transfer member gripping an incoming item during each operating cycle and transferring it to the output conveyor whose speed is greater than that of the input conveyor, the paths of the two conveyors being at least approximately in one plane. The system is characterized in that these paths form a slight angle $\alpha$ with one another or are parallel to one another and the transfer member, which is designed as a pusher, moves along a closed curve path, arranged in a plane which is perpendicular to a plane containing the axis of the path of the input conveyor so that the items are transferred from the path of the input conveyor to the path of the output conveyor.

According to one embodiment of the system disclosed in this patent, the pusher has the form of a plate which has two narrow sides intersecting one another at an at least approximately right angle, the corner formed thereby moving, during each operating cycle, along an approximately elliptically curved path. One narrow side of the pusher serves to transfer an item from the end of the input conveyor to the laterally offset beginning of the output conveyor. The second narrow side, which is approximately perpendicular to the first narrow side, serves the purpose of retaining the following item and synchronizing it with the output conveyor so that it can be properly transferred thereto. A lateral guide disposed opposite the pushers is also provided in order to laterally support the item following the one then being transferred. This lateral guide must also be driven and this leads to a complicated structure of the drive members.

SUMMARY OF THE INVENTION

It is an object of the present invention to simplify both the structure and control of the drive for the conveyor system.

This is accomplished, according to the present invention, by the provision, in addition to the transfer member which is in the form of the main pusher, of an independently driven synchronizing pusher which controls the respective foremost item arriving on the input conveyor and synchronizes its movement with that of the main pusher.

Since the main pusher therefore no longer has to retain the item following the item presently being transferred, the drive for the main pusher can be made much simpler than that taught by the above-cited patent. The allocation of these functions to two separate members also creates conditions which substantially facilitate the precise adjustment of the conveying system. Moreover, the ejecting pusher is under less stress during its operating stroke, which is also an advantage.

BRIEF DESCRIPTION OF THE DRAWINGS

FIG. 1 is a plan view of the basic components of a conveying system, with the apparatus for separating the items, constituting a preferred embodiment of the invention.

FIG. 2 is a schematic side view of the system of FIG. 1.

DESCRIPTION OF THE PREFERRED EMBODIMENTS

Figure 3:
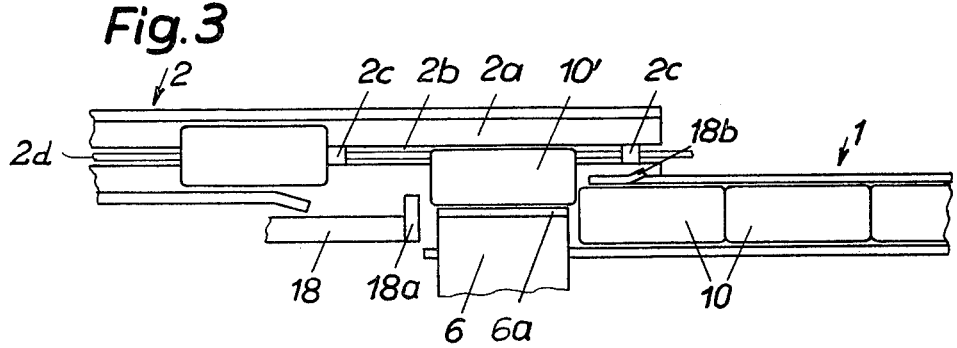
FIGS. 3 to 5 are detail plan views showing the system of FIG. 1 in various phases of its operating cycle.

The conveying system illustrated in FIGS. 1 and 2 includes an input conveyor 1 and an output conveyor 2 whose paths are laterally offset with respect to one another, are parallel to one another and lie in one horizontal plane. The input conveyor 1 includes an endless belt 1a passing over guide rollers 3, only one of which is shown in FIG. 2. Adjustable lateral guide rails 4 for the incoming items 10 are attached to the upper side of the input conveyor. The items 10 are, for example, elongate chocolate bars of approximately square cross section.

The output conveyor 2 has a smooth slide path 2a provided with a longitudinal slot 2b in its center through which protrude entrainment members 2c which are fastened at equal distances to an endless chain 2d. Each member 2c serves to transport one item 10 along the slide path 2a. The slide path 2a is bounded along its lateral sides by rails 5 for guiding the items.

The endless chain 2d with the members 2c is driven faster than is belt 1a. The discharge end of endless belt 1a and the beginning of the output conveyor 2 are arranged to be laterally overlapping and slide path 2a lies at the same level as the upper reach of belt 1a so that the items can easily be pushed from belt 1a to the slide path.

In order to transfer the items 10 arriving at the end of the input conveyor to the beginning of slide path 2a of the output conveyor 2, there is provided a main pusher 6 which includes a pusher plate 6a fastened to an arm 6b. The main pusher 6 is driven so that its corner 6c follows a closed, approximately elliptical curved path 7. For this purpose, one end of arm 6b is pivotally connected to an arm of a two-armed lever 8 and in the region of the other end of arm 6b, it forms a pivotal connection with a guide member 9.

The two-armed lever 8 is mounted to be pivotal about a stationary pin 12 and is driven by a control cam 13 which is shown only in part. The guide member 9 forms a pivotal joint with a second two-armed lever 11 which is also pivotal about pin 12 and which is driven by a control cam 14. The two control cams 13 and 14 are mounted together with a further control cam 15 for rotation as a unit on a shaft 16 which rotates in the direction of arrow 17. During rotation, cams 13 and 14 impart a movement corresponding to curve 7 to main pusher 6.

In order for only the foremost item 10' arriving on the input conveyor 1 to be in exactly the proper position with respect to the main pusher 6 when the latter engages the side of the item in order to push it over to slide path 2a, a similarly driven synchronizing pusher 18 with a pusher plate 18a is provided and arranged so that the plate 18a engages on the leading edge of the incoming item 10' and holds back the other items until the main pusher 6 has pushed away item 10'. The synchronizing pusher 18 is also provided with a guide piece 18b which guides the second item 10 in line at the side thereof opposite the main pusher 6 while the foremost item 10' is pushed away toward the side.

The synchronizing pusher 18, as shown in FIG. 2, is provided in the region of the main pusher 6 with an arm portion 18c which extends above the pusher plate 6a and carries the guide piece 18b. The entire unit is designed so that the two pushers 6 and 18 will not interfere with each other's movements.

The synchronizing pusher 18 is fastened to form a linkage with two parallel levers 19 and 20a. Lever 19 is mounted to be pivotal about a pin 21 and lever 20a constitutes one arm of a two-armed lever 20 which is also mounted to be pivotal on pin 12. The lever arm 20b of lever 20 is driven by the abovementioned control cam 15 which rotates together with shaft 16.

Figure 4:
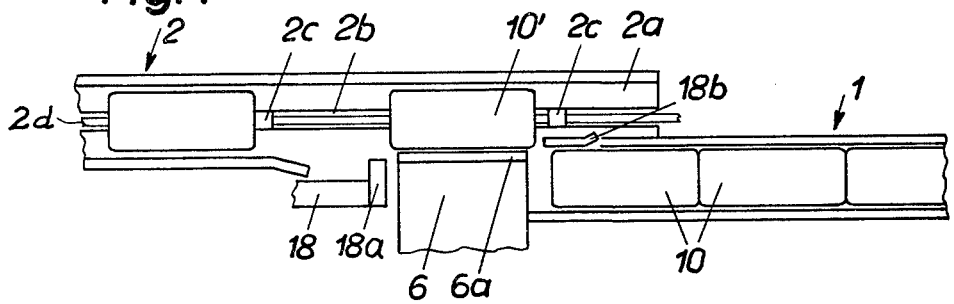
Figure 5:
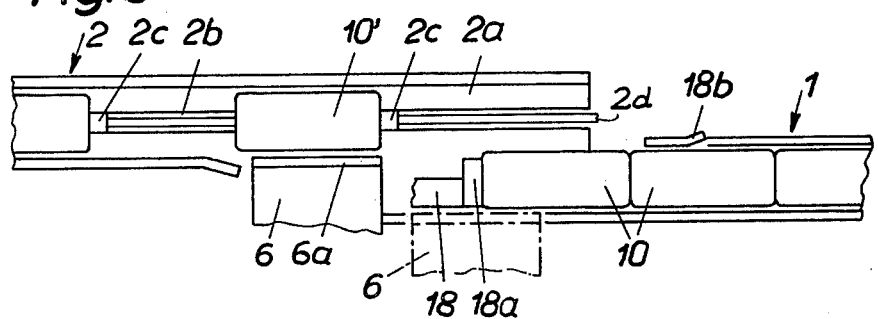

FIGS. 1, 3, 4 and 5 show the sequences of movement of the main pusher 6 and of the synchronizing pusher 18 in their various phases. FIG. 1 shows the starting position of the two pushers at the moment when the pusher plate 6a engages leading item 10'. FIG. 3 shows an intermediate position of the two pushers 6, 18. In FIG. 4 the item 10' is already disposed completely on slide path 2a. At the next movement it will be engaged by engagement member 2c. The synchronizing pusher 18 with plate 18a and guide piece 18b begins at this moment to move toward the right, i.e. opposite to the direction in which items are being conveyed, so that it will shortly thereafter occupy the position shown in FIG. 5 in which the pusher plate 18a contacts the leading end of the next following item. While the main pusher 6 moves from the position shown in solid lines to the starting position shown in dashed lines, in FIG. 5, the synchronizing pusher 18 moves toward the left to the position shown in FIG. 1 whereupon a new operating cycle begins.

Figure 6:
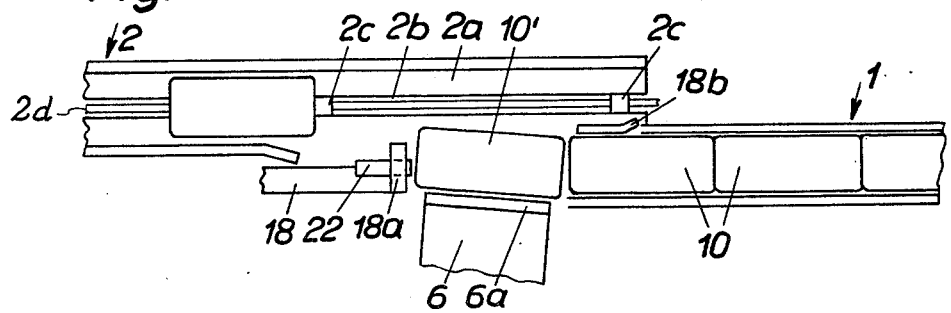
FIG. 6 is a detail view similar to that of FIGS. 3–5 showing another embodiment of the transfer members.

FIG. 6 illustrates schematically two possible variations of the conveying system of FIG. 1. The configurations of the input conveyor 1 and of the output conveyor 2 are completely unchanged. For conveying items 10 which have a sticky surface it may be advisable to design the control cams 13 and 14 and the rod assemblies 8, 9 and 11 so that the main pusher 6 will change at the beginning of its conveying movement to a position which is somewhat oblique to the item conveying direction. This could be achieved quite easily by providing cam 13 and/or cam 14 with a slightly raised portion at the location contacted by the associated cam followers when pusher 6 is at the beginning of its conveying movement. Thus adjacent sides of the items, which may possibly stick together, are more easily separated.

A second variation relates to the design of the plate 18a of the synchronizing pusher 18. This pusher may be provided with an axially displaceable sensor 22 which is accommodated in a bore and which is actuated whenever plate 18a comes in contact with the leading end of an item 10. The sensor may actuate, in a known manner, a control device which stops the drive for the main pusher 6 and possibly also for the output conveyor, when no item 10 is present on the input conveyor. Thus it is assured that each member 2c on the output conveyor will definitely transport an item 10.

It will be understood that the above description of the present invention is susceptible to various modifications changes and adaptations, and the same are intended to be comprehended within the meaning and range of equivalents of the appended claims.

I claim:

1. In a device for separating and conveying items, which device includes: an input conveyor for carrying a plurality of aligned items in end to end engagement; an output conveyor arranged for conveying items at a speed higher than that of the input conveyor, the output conveyor being disposed so that its item-receiving end is adjacent, and laterally overlaps, the item-delivery end of the input conveyor; a main pusher disposed adjacent the region of overlap of the two conveyors; and operating means connected to the main pusher for moving the main pusher in synchronism with the output conveyor in a manner to cause the main pusher to engage the foremost item on the input conveyor and to transfer the same to the output conveyor, the improvement comprising an additional, synchronizing pusher; means connected for driving said synchronizing pusher independently of the main pusher; said synchronizing pusher being disposed and driven for controlling the foremost item on the input conveyor and for synchronizing the movement of that item with that of the main pusher; and means defining a guide piece carried by said synchronizing pusher and located in the region between said conveyors at the lateral side of said input conveyor which is near said output conveyor; and wherein said synchronizing pusher further comprises a sensor arranged to be actuated whenever said synchronizing pusher comes in contact with the leading end of an item on said input conveyor in order to stop the drive for both said pushers when there is no item on said item-delivery end of said input conveyor.

2. In a device for separating and conveying items, which device includes: an input conveyor for carrying a plurality of aligned items in end to end engagement; an output conveyor arranged for conveying items at a speed higher than that of the input conveyor, the output conveyor being disposed so that its item-receiving end is adjacent, and laterally overlaps, the item-delivery end of the input conveyor; a main pusher disposed adjacent the region of overlap of the two conveyors; and operating means connected to the main pusher for moving the main pusher in synchronism with the output conveyor in a manner to cause the main pusher to engage the foremost item on the input conveyor and to transfer the same to the output conveyor, the improvement comprising an additional, synchronizing pusher; and means connected for driving said synchronizing pusher independently of the main pusher; said synchronizing pusher being disposed and driven for controlling the foremost item on the input conveyor and for synchronizing the movement of that item with that of the main pusher; and wherein said main pusher includes a plate arranged to engage the foremost item on said input conveyor and said main pusher is controlled to cause said plate to take on a position which is oblique to the conveying direction of the items at least during part of its operating stroke.

3. A device as defined in claim 2 wherein said main pusher plate is transferred to the position which is oblique to the direction of conveyance of the items only when it has come into contact with the foremost item.

4. In a device for separating and conveying items, which device includes: an input conveyor for carrying a plurality of aligned items in end to end engagement; an output conveyor arranged for conveying items at a speed higher than that of the input conveyor, the output conveyor being disposed so that its item-receiving end is adjacent, and laterally overlaps, the item-delivery end of the input conveyor; a main pusher disposed adjacent the region of overlap of the two conveyors; and operating means connected to the main pusher for moving the main pusher in synchronism with the output conveyor in a manner to cause the main pusher to engage the foremost item on the input conveyor and to transfer the same to the output conveyor, the improvement comprising an additional, synchronizing pusher and means connected for driving said synchronizing pusher independently of the main pusher; said synchronizing pusher being disposed and driven for controlling the foremost item on the input conveyor and for synchronizing the movement of that item with that of the main pusher; and wherein said synchronizing pusher further comprises a sensor arranged to be actuated whenever said synchronizing pusher comes in contact with the leading end of an item on said input conveyor in order to stop the drive for both said pushers when there is no item on said item-delivery end of said input conveyor.

5. A device as defined in claim 4 wherein said sensor is further arranged to stop said output conveyor when there is no item on said item-delivery end of said input conveyor.

6. In a device for separating and conveying items, which device includes: an input conveyor for carrying a plurality of aligned items in end to end engagement; an output conveyor arranged for conveying items at a speed higher than that of the input conveyor, the output conveyor being disposed so that its item-receiving end is adjacent, and laterally overlaps, the item-delivery end of the input conveyor; a main pusher disposed adjacent the region of overlap of the two conveyors; and operating means connected to the main pusher for moving the main pusher in synchronism with the output conveyor in a manner to cause the main pusher to engage the foremost item on the input conveyor and to transfer the same to the output conveyor, the improvement comprising an additional, synchronizing pusher; and means connected for driving said synchronizing pusher independently of the main pusher; said synchronizing pusher being disposed and driven for controlling the foremost item on the input conveyor and for synchronizing the movement of that item with that of the main pusher; and wherein said synchronizing pusher further comprises a plate disposed to engage the foremost item on said input conveyor, an arm portion carrying said plate and said guide piece and mounted above the portion of said main pusher which engages the foremost item on said input conveyor, and a sensor arranged to be actuated whenever said synchronizing pusher comes in contact with the leading end of an item on said input conveyor in order to stop the drive for both said pushers when there is no item on said item-delivery end of said input conveyor.

* * * * *